United States Patent [19]

Maeda et al.

[11] Patent Number: 4,524,160

[45] Date of Patent: Jun. 18, 1985

[54] DIRECTLY MOLDABLE RESIN COMPOSITIONS FOR COMPOSITE PLASTICS

[75] Inventors: Nobuhisa Maeda, Takada; Tadashi Sakairi; Tamotsu Wakahata, both of Katano, all of Japan

[73] Assignee: Matsushita Electric Industrial Co., Ltd., Japan

[21] Appl. No.: 577,948

[22] Filed: Jan. 27, 1984

Related U.S. Application Data

[63] Continuation of Ser. No. 367,226, Apr. 8, 1982, abandoned.

[30] Foreign Application Priority Data

Apr. 9, 1981 [JP] Japan ................................. 56-54136

[51] Int. Cl.$^3$ .......................... C08K 9/00; C08K 7/00
[52] U.S. Cl. .................................... 523/200; 523/215; 523/216; 523/217; 523/218; 523/220; 523/221; 523/205
[58] Field of Search ............... 523/200, 215, 216, 217, 523/218, 220, 221

[56] References Cited

U.S. PATENT DOCUMENTS

| | | | |
|---|---|---|---|
| 3,857,813 | 12/1974 | Stain et al. | 523/220 |
| 3,919,164 | 11/1975 | Hattori et al. | 523/221 |
| 4,067,847 | 1/1978 | Yui et al. | 523/220 |
| 4,120,844 | 10/1978 | Meyer et al. | 524/427 |
| 4,238,537 | 12/1980 | Kerr | 428/35 |

FOREIGN PATENT DOCUMENTS 1003612 1/1977 Canada .

OTHER PUBLICATIONS

Derwent Abst. 11987 D/08, (2-81), DE 3027149.
Derwent Abst. 63326 D/35, (7-81), J56086945.
Derwent Abst. 78563 D/43, (9-81), J56115343.
Derwent Abst. 88139 D/48, (10-81), J56133140.
Derwent Abst. 22707 E/12, (2-82), J57025908.

Primary Examiner—Herbert J. Lilling
Attorney, Agent, or Firm—Lowe, King, Price & Becker

[57] ABSTRACT

A directly moldable resin composition for a composite plastic is disclosed, which comprises a predetermined amount of a mixture of pellets of a thermoplastic synthetic resin having an average size of 2.0 mm or larger and particles of a thermoplastic resin having an average size in a predetermined range, or particles of a thermoplastic resin alone having an average size of below 900 microns, and the balance of at least one filler such as particulate inorganic fillers or fibrous fillers. The particles of a thermoplastic resin should preferably be contained in an amount equal to or higher than 100% by volume of the at least one filler. When determined by a suspending tensile failure method at a tension speed of 2 mm/cm$^2$, a particulate filler should preferably have an adhesion force in the range of below 4 g/cm$^2$. Greater amounts of the mixture or the particles of thermoplastic resins can be used when the filler is treated on the surface thereof with organic compounds with a H.L.B. value below 13 so as to improve affinity for synthetic resins.

4 Claims, 3 Drawing Figures

DIRECTLY MOLDABLE RESIN COMPOSITIONS FOR COMPOSITE PLASTICS

This is a continuation of application Ser. No. 367,226, filed Apr. 8, 1982, and now abandoned.

BACKGROUND OF THE INVENTION

1. Field of the Invention

This invention relates to preparation of composite plastics and more particularly, to directly moldable resin compositions adapted for use in ordinary molding machines.

2. Description of the Prior Art

Preparation of dispersion composite plastics has ordinarily been performed by the following three methods.

1. Compounding

Various starting materials such as synthetic resins, fillers and additives are provided in predetermined amounts and kneaded under melting conditions of the resins in a kneader and granulator machine, and pelletized into a desired form. This compounding technique is the most widely employed method of preparing composite plastics.

2. Concentrate or Master Batch Method

Compounding ingredients other than synthetic resins such as fillers, additives and the like are admixed with a synthetic resin to be mixed in concentrations higher by several times than in intended concentrations, and kneaded and pelletized in a kneader and granulator machine.

Upon application, the resulting pellets are mixed or diluted with a synthetic resin of the same type as used above to have the intended concentrations of the compounding ingredients. This method has widely been used on mixing of colorants with synthetic resins.

3. Direct Method

Synthetic resins and compounding ingredients such as fillers, additives and the like are charged into the feed port of a molding machine as they are without melting and kneading, and are plasticized, kneaded and then molded in a screw cylinder. This technique is now adoptged for use in extrusion molding, injection molding and the like, and has extensively been studied and performed as useful especially in obtaining moldings of glass fiber-incorporated composite plastics.

These techniques have the following advantages, respectively. That is, the compounding method is advantageous in that starting materials are formulated to have a composition required for an intended molded article, and can thus be molded with ease without needing additional steps. The master batch method is low in production cost per unit weight of molding materials. Moreover, the direct method has the advantage that because the kneading and molding steps are effected at the same time and thus the power energy as will usually be needed in the needing step can be saved, making it possible to reduce the production cost, coupled with another advantage that because of the reduction in heat history, the obtained moldings exhibit excellent physical strengths and stable quality.

In order to obtain composite materials of the uniform quality, it is necessary to impart a great volumetric change and a strong shearing force to starting materials at the time of kneading. Accordingly, kneading conditions such as kneading temperature, the number of revolutions of screw, kneading temperature and the like, and the design in shape of the screw give a great influence on the quality of composite material. In general, the screw and the cylinder of an ordinary injection molding machine are very simple in shape and have the ability to plasticize resins but are not designed to disperse fillers in resins by kneading. Accordingly, the kneading in injection molding machines has heretofore been attempted only experimentally but has not been put into practice widely.

In recent years, a screw and cylinder arrangement adapted for the injection molding by the direct method are commercially sold. This screw and cylinder arrangement has the functions of plasticization, kneading and injection molding but is of the specific and very complicated form and is thus very expensive. Additionally, the difficulty encounters in changing color or materials.

SUMMARY OF THE INVENTION

An object of the invention is to provide resin compositions for composite plastics which are readily, directly moldable into a desired form by hitherto widely employed, ordinary molding machines and particularly injection or extrusion molding machines, without use of any additional kneading devices.

Another object of the invention is to provide directly moldable resin compositions for composite plastics whereby fillers are homogeneously dispersed and the resulting articles exhibit a stable and high quality with good appearance.

A further object of the invention is to provide resin compositions which are directly moldable without use of a screw of the specific type.

A still further object of the invention is to provide directly modable resin compositions which can be converted to composite plastics under conditions where the heat history is less than that of the known compounding method and thus resins suffer a less degree of thermal deterioration.

Yet another object of the invention is to provide directly moldable resin compositions from which inexpensive composite plastics can be obtained because of the unnecessity of kneading cost.

The above objects can be achieved, according to one aspect of the present invention, by a directly moldable resin composition for composite plastics which comprises from 50 to 98.5% by volume of a mixture of pellets of a thermoplastic resin having an average size not smaller than 2 mm and particles of a thermoplastic resin having an average size not larger than 500 microns, and correspondingly from 50 to 1.5% by volume of at least one filler selected from the group consisting of particulate inorganic fillers having an average size ranging from 1 to 50 microns and fibrous fillers having an aspect ratio not smaller than 5. The particles of the resin should preferably be contained in an amount equal to or higher than 100% by volume of the filler so as to fully attain uniform dispersability of the filler.

According to another aspect of the invention, there is provided a resin composition which comprises from to 50 to 98.5% by volume of particles of a thermoplastic resin having an average size of below 900 microns and the balance of at least one inorganic filler selected from the group consisting of particulate fillers having an average size ranging from 1 to 50 microns and fibrous fillers having an aspect ratio not smaller than 5.

In the former embodiment, the pellets and particles may be made of the same type or different types of thermoplastic resins and are usually made of the same type resin.

In the case where a particulate filler is used, an adhesion force of the filler which has been charged into a cell to have a void content of from 0.60 to 0.75 should preferably be in the range of below 4 g/cm² when determined at a tension speed of 2 mm/min.

In order to further improve the dispersability of fillers in resins, it is preferable to treat the filler with organic compounds such as surface active agents to render the filler surface oleophilic so as to improve affinity for synthetic resins.

The above and other objects, advantages and features of the present invention will become apparent from the following description taken in conjunction with the accompanying drawings.

DETAILED DESCRIPTION AND PREFERRED EMBODIMENTS OF THE INVENTION

Figure 1:
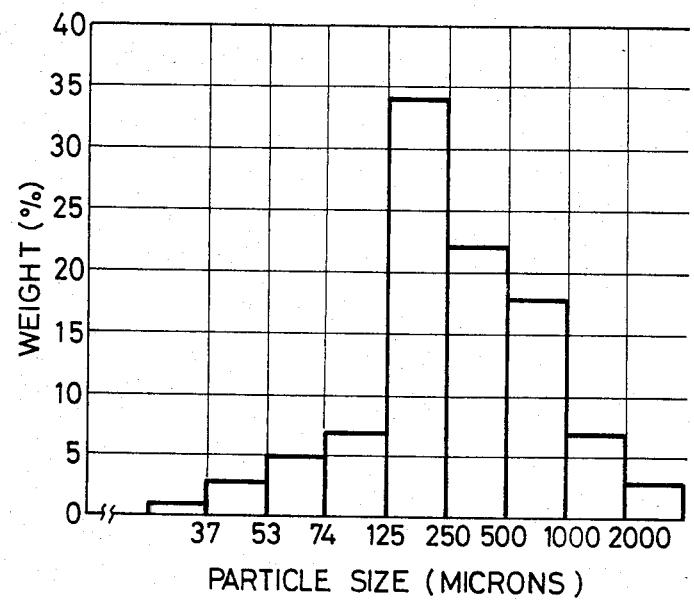
FIG. 1 shows a size distribution of polypropylene particles having an average size 250 microns.

The thermoplastic resins useful in the present invention are those which are synthetic resins and are employed in ordinary molding processes for composite plastics and include, for example, vinyl chloride resins, vinyl acetate resins, acrylic resins, polystyrene, ABS resins, polyolefins, fluorocarbon resins, polyamide resins, acetal resins, polycarbonates, and the like. Among them, polylefins such as polyethylene, polypropylene, polybutene and the like with or without being modified as usual are preferably used for this purpose.

In the practice of the invention, the size or sizes of thermoplastic resin are important rather than the kind of the resin. That is, in accordance with one embodiment of the invention, thermoplastic resins which may be the same or different in kind should be used in the form of pellets and particles having average sizes of from 2 mm to about 5 mm and below 500 microns, respectively. When only pellets of a thermoplastic resin having an average size over 2 mm are used for directly molding into a composite plastic by an ordinary injection molding machine, dispersion of a filler used becomes poor and the resulting article shows poor appearance with the attendant lowering of mechanical strengths. On the other hand, use of thermoplastic resin particles alone having an average size defined above is very advantageous in dispersion of filler but may, in some cases, cause the bridging phenomenon in the hopper depending on the type of filler when the amount of fillers exceeds 50% by volume of the resin particles, thus impeding the stable feed of the particles into the cylinder. This can be avoided by using a combination of the pellets and the particles, by which there can be obtained a molded article which exhibits excellent physical properties and good appearance and is stable in quality. Preferably, the particles of thermoplastic resin should be contained at a ratio, to a filler, of at least 1:1 on the volumetric basis.

In accordance with another embodiment of the invention, the combination of pellets and particles of thermoplastic resin can be replaced by resin particles only which have an average size ranging below 900 microns. In this case, the particles should be present in an amount by volume equal to or greater than the amount of filler, by which no bridging takes place in the hopper, and uniform dispersion of filler is assured. It will be noted here that the lower limit of the particles of thermoplastic resin in both cases is generally 30 to 40 microns on average. This is because upon preparation of synthetic resins, they are obtained in the form of particles having a size of 30 to 40 microns by certain preparation techniques. To obtain finer particles needs an additional powdering process, which has no merit in view of the purposes of the present invention. Accordingly, the lower limit of the average size of the particles is 30 to 40 microns. These compositions are particularly useful in injection or extrusion molding machines which are currently employed.

The filler should be at least one member selected from powders of inorganic fillers and fibrous fibers as mentioned above. Useful inorganic fillers are in the form of a powder having an average size of from 1 to 50 microns though the average size, more or less, varies depending on the type of particulate filler as will be described later. Generally, powders or particles having an average size over 50 microns serve as a stress-concentration body when a molded article containing such particles therein suffers an external force, and is subject to breakage of the article. Average sizes smaller than 1 micron are not advantageous because such particles show too great a coagulating force and adhere to one another, resulting in the failure in dispersion.

In order to evaluate the dispersability of particulate filler, an adhesion force of filler particles can effectively be used in combination with the average size. To achieve uniform dispersion of filler particles in synthetic resins, it is necessary to reduce coagulated filler particles into primary particles by a mechanical energy sufficient to exceed the coagulating force. Accordingly, the magnitude of the coagulating force of filler particles has close relation with the dispersability. The adhesion force becomes higher in a smaller void content of the particles. The void content mainly depends on the type of powder and it is difficult to measure the adhesion force of particles at the same level of void content. In the practice of the invention, when the void content is in the range of 0.60 to 0.75, the adhesion force should preferably be in the range below 4 g/cm². Over this value, filler particles with the defined range of the average size may not be reduced into primary particles by means of the screw of ordinary injection or extrusion molding machines, resulting in poor dispersion.

It will be noted that the adhesion force is determined by a suspending tensile failure method in which a test powder is charged into a cell having a suitable size so as to have a predetermined range of void content of 0.60 to 0.75 and subjected to a tension speed of 2 mm/min. This is particularly described in examples.

On the other hand, fibrous fillers having an aspect ratio below 5 have only a small reinforcing effect and do not contribute to improve physical strengths at all.

In order to further facilitate uniform dispersion of fillers in thermoplastic resins, individual particles of a filler are preferably coated with an organic compound having a hydrophilic-oleophilic balance not higher than 13.

In general, synthetic resins constituting composite plastics are highly oleophilic in nature and inorganic fillers are of the hydrophilic nature, so that a molten resin shows poor wettability to such filler and are not compatible with each other. This is the reason why the dispersion of fillers in resins is difficult. In order to improve the wettability, it is advantageous to render the surface of filler oleophilic.

Typical examples of compounds showing the oleophilic effect are surface active agents.

Surface active agents have in one molecule thereof both a hydrophilic group and an oleophilic group, and have the ability to allow compatibility of both types of materials at their interface. An index indicating the balance between the hydrophilic and oleophilic groups is a hydrophilic-oleophilic balance (hereinafter abbreviated as H.L.B.). In general, the H.L.B. is indicated by a value ranging 0–20 and a smaller value shows a higher degree of oleophilic property and vice versa.

When a filler is covered with a surface active agent on the surface thereof, the molecules of the agent are arranged in such a way that the hydrophilic groups face the surface of filler and the oleophilic groups turn outward. As a result, the filler is rendered oleophilic and shows good compatibility with synthetic resins, resulting in uniform dispersion.

The organic compounds used in the present invention should favorably have a hydrophilic-oleophilic balance below 13. Surface active agents having the balance over 14 exhibit only a very slight dispersion effect and a number of coagulations of filler may be present in molded articles. The optimum hydrophilic-oleophilic balance may, more or less, vary depending on the type of resin and is in the range of from 3 to 5 for polyolefins which are highly oleophilic. The amount of the surface active agent is usually in the range of from 0.15 to 14.0% by volume of the filler. Amounts less than 0.15 vol. % show little or no effect of improving the dispersability, whereas amounts over 14.0 vol. % are unfavorable since surface active agents tend to gather, so that the coagulating force among the filler particles becomes great, thus impeding uniform dispersability and increasing the number of coagulations having sizes over 0.5 mm in the resulting article.

Organic compounds or surface active agents showing a hydrophilic-oleophilic balance below 13 are known in the art and numerous, and are not particularly described herein. Specific and useful examples of these agents are shown in examples.

The treatment of fillers including both types of particulate and fibrous fillers with surface active agents is feasible by any methods including (1) a method in which a powder of filler and a surface active agent are charged into an agitated container at elevated temperatures to melt the surface active agent thereby covering the powder with the molten agent, (2) a mechanochemical method of covering the surface of a filler with a surface active agent while grinding a raw material for filler into pieces, and (3) a method in which a surface active agent is dissolved in a suitble solvent, a powder of filler is charged into the solution in order to adsorb the surface active agent on the surface of the filler, and the solvent and an excess of the agent are removed from the filler. The average size of fillers which have not been treated so as to be imparted with the oleophilic property is in the range of 1 to 50 microns, but the treated fillers may be finer in size. Futher, these fillers may be added to the composition up to about 70% by volume of the composition because of their improved affinity for resins.

The fillers which have been treated with surface active agents on the surface thereof show good affinity for and good dispersability in olefin resins and particularly olefin resins having a bulk density ranging from 0.34 to 0.72. The olefin resins include, for example, polypropylene, polyethylene, propylene-ethylene copolymer, polybutene, polymethylpentene and the like.

As an example of olefin resins, polypropylene is particularly described.

Polypropylene is usally obtained in the form of particles or granules as a final product. The average size of the product is generally below 1 mm and the bulk density is in the range of from 0.34 to 0.54.

Because polypropylene is susceptible to thermal oxidation and readily deteriorates, commercial products are available as pellets after addition of stabilizers to the particulate or granulate polypropylene and the pellets have an average size over 2 mm and a bulk density of 0.51 to 0.55. Proper mixing of the pellets and the particles of polypropylene gives a desired level of bulk density.

When the bulk density is preferably controlled to have a value of from 0.34 to 0.72, the filler treated with a surface active agent can be suitably dispersed in polypropylene only by a simple screw and cylinder arrangement such as of an ordinary injection molding machine. At bulk densities over 0.72, the pellets or particles must almost be packed in the closest way, and there are no values over 0.72 unless a size distribution is ideal. Reference has been made to polypropylene, which is true of other olefin resins.

Thermoplastic resins and fillers can be directly fed into molding machines and particularly into an injection or extrusion molding machine by (1) mixing predetermined amounts of a thermoplastic resin and a filler and then supplying the mixture, or (2) supplying predetermined amounts of a thermoplastic resin and a filler, separately.

As to the amounts of the respective ingredients, the mixture of particles and pellets of synthetic resins is used in an amount of 50 to 98.5% by volume of the composition. Smaller amounts have the possibility of causing the bridging phenomenon to occur, while smaller amounts are unfavorable because fillers to be introduced becomes too small in amount and do hardly improve the resin composition as a composite plastic. This is true of particles of synthetic resins which are used singly. The fillers are used in amounts corresponding to those of the resin component or components. Within the above range of amount, the respective ingredients are properly used depending on the purpose of final composite plastics as is well known in the art.

As a matter of course, aside from the above components, any additives ordinarily employed for molding purposes such as antioxidants, colorants, plasticizers, lubricants, coupling agents and the like may be added.

The present invention is particularly described by way of examples.

EXAMPLE 1

A resin composition composed of 8.0% by volume of particles of ethylene-modified propylene (MI=15) having an average size of 250 microns with a size distribution shown in FIG. 1, 84.0% by volume of pellets of ethylene-modified propylene (MI=15) having an average size of 3.0 mm, and 8.0% by volume of calcium carbonate having an average size of 1.8 microns was pre-mixed for 5 minutes at 1500 r.p.m. by means of a high speed flow agitator (Super Mixer SMG-2, made by Kawada Seishakusho K.K.), followed by charging into the hopper of an injection molding machine (N-200A, by Nippon Steel Making Co., Ltd.) and directly molding at a resin temperature of 220° C. to obtain a 150 mm×230 mm×3.2 mm plate. This plate was subjected to the compression molding to obtain a 0.3 mm thick film. The film was evaluated to determine the dispersability of calcium carbonate, revealing that the filler was uniformly dispersed in the ethylene-modified polypropylene. Further, the plate was cut into pieces and their mechanical strengths were measured.

The results are shown in Table 1, in which each value is an average of five measurements in this and succeeding examples and comparative examples.

EXAMPLES 2-5

Figure 2:
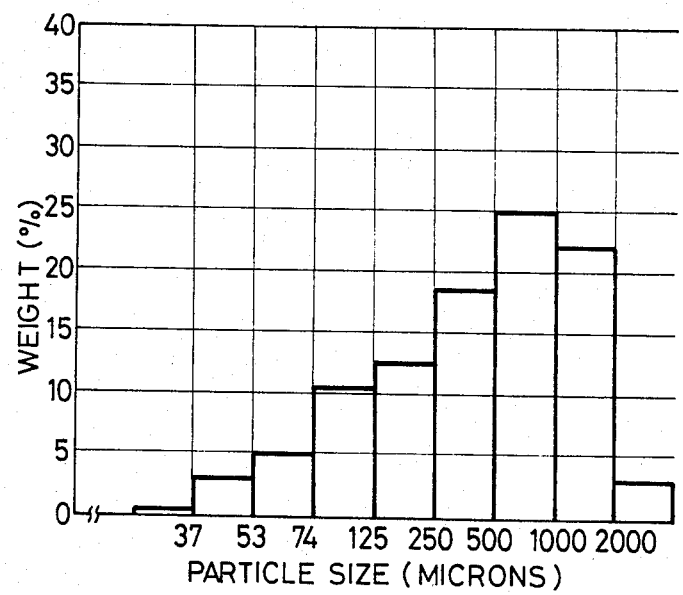
FIG. 2 shows a size distribution of polypropylene particles having an average size of 500 microns.

Polypropylene (MI=13) particles having an average size of 500 microns with a size distribution shown in FIG. 2, pellets of polypropylene (MI=13) having an average size of 2.0 mm, and a powder of calcium carbonate having an average size of 2.3 microns were formulated in ratios indicated in Table 2. The respective mixtures were molded and evaluated in the same manner as in Example 1. Calcium carbonate was uniformly dispersed in the polypropylene in all the examples. The results of physical strengths are shown in Table 1.

COMPARATIVE EXAMPLES 1-4

Pellets of polypropylene (M=13) having an average size of 4.5 mm were mixed with a powder of calcium carbonate of the same size and amounts as in Examples 2-5, respectively. The resulting mixtures were each kneaded and granulated using a unidirectionally rotating biaxial extruder (PCM-30, by Ikegai Tekko-sho K.K.) to obtain pellets having a diameter of 3 mm and a length of 4 mm. These pellets were molded in the same manner as in Example 1 to obtain a plate. The plate was cut into pieces, followed by the measurement of mechanical strengths. The test results are shown in Table 1.

TABLE 1

| Physical Properties | Tensile Strength (kg/cm$^2$) | Bending Strength (kg/cm$^2$) | Izot Impact Strength (kg-cm/cm$^2$) |
|---|---|---|---|
| Example No. | | | |
| 1 | 260 | 430 | 5.5 |
| 2 | 300 | 595 | 3.0 |
| 3 | 290 | 590 | 2.9 |
| 4 | 280 | 570 | 2.5 |
| 5 | 255 | 520 | 2.0 |
| Comparative Example No. | | | |
| 1 | 295 | 600 | 2.9 |
| 2 | 285 | 590 | 2.8 |
| 3 | 280 | 565 | 2.5 |
| 4 | 260 | 515 | 1.9 |

TABLE 2

| Example No. | Amount of Particles of P.P. Having Average Size of 500 microns | Amount of Pellets of P.P. Having Average Size of 2.0 mm | Powder of Calucium Carbonate |
|---|---|---|---|
| 2 | 3.7 Vol % | 92.6 Vol % | 3.7 Vol % |
| 3 | 7.4 | 85.2 | 7.4 |
| 4 | 11.1 | 77.8 | 11.1 |
| 5 | 14.8 | 70.4 | 14.8 |

As will be seen from Table 1, the molded articles obtained from the compositions according to the invention by the direct molding procedure have the same levels of the strengths as the molded articles obtained by the known compounding method.

EXAMPLES 6-8

Particles of polypropylene as used in Examples 2-5 and particles of polyethylene having a density of 0.92 were sifted and classified into several groups. 92% by volume of each of the classified particles of polypropylene or polyethylene and 8% by volume of $CaCO_3$ used in Examples 2-5 were mixed and directly molded. Each molded article was converted into a film in the same manner as in Example 1 and the number of $CaCO_3$ coagulations present in the film were countered to evaluate the dispersability of $CaCO_3$. The results are shown in Table 3.

Moreover, the above procedure was repeated using the particles of polypropylene which had not been sifted and pellets of polypropylene of the same grade as the particles were mixed in different ratios, to which was added 8% by volume of $CaCO_3$, followed by directly molding. The resulting molded articles were evaluated with respect to the dispersability of the filler. The results are shown in Table 4.

Also, the bulk density of the resins used in Examples 6-8 was measured with the results shown in Tables 3 and 4.

TABLE 3

| Example | Resin | Particle Size (microns) | Bulk Density | Number of Coagulations Per Square Centimeter |
|---|---|---|---|---|
| 6 | Polypropylene | 125 | 0.45 | 0 |
| | | 250 | 0.46 | 0 |
| | | 500 | 0.48 | 0 |
| | | 900 | 0.55 | 0 |
| | | over 1000 | 0.56 | 7 |

TABLE 4

| Ex. | Amount of $CaCO_3$ (vol %) | Amount of Particulate Polypropylene (vol %) | Amount of Polypropylene Pellets (vol %) | Bulk Density of Polypropylene | Number of Coagulations Per Square Centimeter |
|---|---|---|---|---|---|
| 8 | 8 | 0 | 92 | 0.56 | 15 |
| | 8 | 4 | 88 | 0.57 | 1 |
| | 8 | 8 | 84 | 0.63 | 0 |
| | 8 | 12 | 80 | 0.67 | 0 |
| | 8 | 23 | 69 | 0.69 | 0 |

The above results reveal that when the particulate resin alone is used, the average size should be below 900 microns. Alternatively, combinations of resin particles and pellets are found to ensure satisfactory dispersability, and the ratio of the resin particles to the filler is preferably 1 or higher.

Moreover, it was found that olefin resins other than polypropylene were likewise usable.

EXAMPLE 9

Particulate polypropylene (average size: 250 microns) as used in Example 1 and a $CaCO_3$ powder having an average size of 5 microns were mixed in different ratios, followed by molding in the same manner as in Example 1 to evaluate the dispersability in each molded article. The results are shown in Table 5 below.

TABLE 5

| Amount of $CaCO_3$ (vol %) | Number of Coagulations | Remarks |
|---|---|---|
| 1 | 0 | — |
| 8 | 0 | — |
| 20 | 0 | — |
| 40 | 0 | — |
| 60 | 0 | — |
| 70 | 0 | — |
| 80 | — | Excess load was imposed on the screw on rotation and no molding was possible |

The above results show that the filler may be used up to 70 vol. % with respect to the dispersability, but amounts greater than 50 vol. % may involve the undesirable bringing phenomenon in practical direct molding operations.

EXAMPLE 10

3.0 vol. % of particles of ethylene-modified polypropylene (MI=15) having an average size of 250 microns and a size distribution shown in FIG. 1 and 89.0 vol. % of pallets of ethylene-modified polypropylene (MI=15) having an average size of 3.0 mm were mixed, to which was added 8.0 vol. % of each of a talc powder having an average size of 8.0 microns, an aluminium hydroxide powder having an average size of 2.0 microns, a mica sulfate powder having an average size of 40 microns, and glass fibers having a diameter of 10 microns and a length of 6 mm using an aminosilane as a binder. Each composition was molded by the same direct molding procedure as in Example 1. For comparison, the starting materials used above were compounded in the same manner as in Comparative Example 1 and molded. The results of these different procedures are shown in Table 6 below.

TABLE 6

| Filler | Tensile Strength ($kg/cm^2$) | | Bending Strength ($kg/cm^2$) | |
|---|---|---|---|---|
| | Direct Molding | Compounding | Direct Molding | Compound. |
| Talc | 400 | 395 | 625 | 625 |
| Aluminium hydroxide | 340 | 325 | 570 | 565 |
| Mica | 380 | 375 | 640 | 630 |
| Glass fiber | 950 | 830 | 1,350 | 1,150 |

From the above results, it will be seen that mechanical strengths of the molded articles obtained by the direct molding are equal to or higher than those of the articles obtained by the known compounding and molding procedure.

EXAMPLES 11-20

A calcium carbonate powder having an average size of 1.1 microns and each of organic compounds having a hydrophilioleophilic balance below 13 in an amount of 3.0 vol. % based on the calcium carbonate were premixed in a high speed flow agitator (Super Mixer SMG-20, by Kawada Seisaku-sho K.K.) heated to over a melting point of the compound at 1,500 r.p.m. for 20 minutes, so that the calcium carbonate was covered with the organic compound on the surface thereof.

Figure 3:
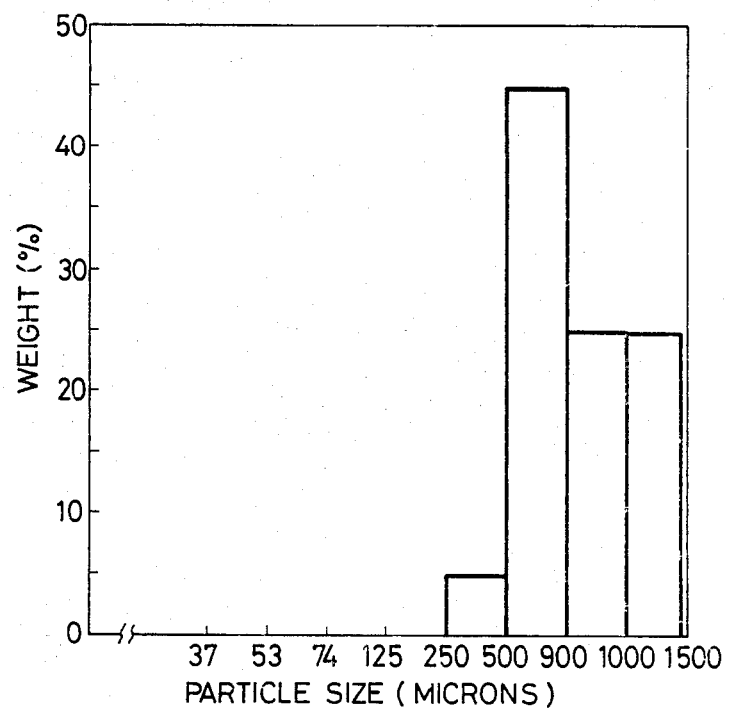
FIG. 3 shows a size distribution of polypropylene particles having an average size of 900 microns.

Then, a mixture of 8.5 vol. % of each of the thus obtained covered calcium carbonate powders and 91.5 vol. % of particles of ethylene-modified polypropylene (MI=9) having an average size of 900 microns and a size distribution shown in FIG. 3 was processed in the same manner as in Example 1 to obtain a 0.3 mm thick film. The number of $CaCO_3$ coagulations present in each film was counted with the results shown in Table 7.

COMPARATIVE EXAMPLES 5-7

The general procedure as in Examples 11-20 was repeated using organic compounds having a hydrophilicoleophilic balance over 14 and calcium carbonate which had not been applied with any organic compound. The results are shown in Table 7.

TABLE 7

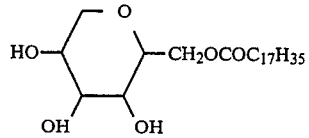

| Ex. No. | Compounds for Surface Treatment of $CaCO_3$ | H.L.B. of Compound | Dispersability (Number of Coagulations/$cm^2$) |
|---|---|---|---|
| 11 | Ethers $-(-CH_2CH_2-O-)-(\overset{CH_3}{\underset{|}{CH}}-CH_2-O-)_3-$ | 3 | 3 |
| 12 | $-(-CH_2CH_2-O-)_{10}-(\overset{CH_3}{\underset{|}{CH}}-CH_2-O-)_{11}$ | 13 | 7 |
| 13 | Ethers $CH_2-CH-CH_2$ with $OH$, $OH$, $OCOC_{17}H_{35}$ | 3.5 | 1 |
| 14 | (structure with HO-, OH, OH, $CH_2OCOC_{17}H_{35}$ on ring with O) | 4.7 | 1 |
| 15 | $C_{17}H_{35}COOC_{18}H_{37}$ | <1 | 3 |
| 16 | Amides $C_{11}H_{23}CON(CH_2CH_2OH)$ | 10 | 5 |

TABLE 7-continued

| | Compounds for Surface Treatment of $CaCO_3$ | H.L.B. of Compound | Dispersability (Number of Coagulations/ $cm^2$) |
|---|---|---|---|
| 17 | $CH_2CONHC_{18}H_{37}$<br>\|<br>$CH_2CONHC_{18}H_{37}$ | <1 | 2 |
| 18 | Alcohol $C_{18}H_{37}OH$ | <1 | 3 |
| 19 | Wax Hardened castor oil | <1 | 5 |
| 20 | Metallic soap $(C_{17}H_{25}COO)_2Ca$ | <1 | 2 |
| Comp. Ex. | | | |
| 5 | Ethers Nil | — | 20 |
| 6 | $C_8H_{17}CH=CH-C_8H_{16}-O(-CH_2-CH_2O)_{15}H$ | 14 | 13 |
| 7 | $C_8H_{17}CH=CH-C_8H_{16}-O(-CH_2-CH_2O)_{30}H$ | 17 | 15 |

The results of Table 7 reveal that the dispersability is improved by the treatment of $CaCO_3$ with any of the surface active agents and that the improving effect is more remarkable when the surface active agents having a H.L.B. value below 13, resulting in the extreme reduction of the number of coagulations.

EXAMPLE 21

A calcium carbonate powder having an average size of 0.5 microns was treated on the surface thereof with the compound of Example 13 in amounts of 0.03, 0.15, 0.31, 1.52, 3.01, 14.00 and 20.00 vol. %. 8.5 vol % of each powder and the balance of the same particles and pellets of polypropylene as used in Example 1 were used and processed in the same manner as in Example 1 to evaluate the dispersability of calucium carbonate. As a result, it was found that within the range of 0.15–14.00 vol. % of the compound, calcium carbonate did not coagulate and was uniformly dispersed. Amounts smaller than 0.03 vol. % resulted in coagulations of calucium carbonate having sizes below 0.5 mm. On the other hand, with larger amounts, coagulations having sizes over 1.0 mm were observed. Accordingly, a suitable amount of the compound was in the range of 0.15 to 14.00 vol. % of calucium carbonate.

EXAMPLE 22

Talc, $Al(OH)_3$ and $BaSO_4$ as used in Example 10 were each treated with the compound of Example 13 in an amount of 3.0 vol. % of the filler, followed by the direct molding. The compounding and molding procedure in the same manner as in Example 10 was also conducted in place of the direct molding for comparative purposes. The results were similar to those of Table 6.

EXAMPLE 23

The resin components used in Examples were measured to determine their bulk densities as shown in Tables 3 and 4. These resins and surface-treated $CaCO_3$ of Example 13 were used and directly molded in the same manner as in Example 1 to evaluate the dispersability. As a result, it was found that when the average size of the resins was below 900 microns and the bulk density was below 0.55, the filler was uniformly dispersed.

Furthermore, it was confirmed that the filler was satisfactorily dispersed when a mixture of particles of polypropylene and pellets of polypropylene having a controlled bulk density of 0.72 was used.

EXAMPLES 24–31

Powders of typical fillers and their average sizes used for measurement of adhesion force are shown in Table 8. These fillers were each charged into a cell having an inner diameter of 50 mm and a depth of 19.95 mm in such a way that the charged powder was compressed by a suitable means to have a height of 9.95 mm, and the cell was set in an adhesion tester. The adhesion force was measured by a suspending tensile failure technique, in which the power layer was subjected to a tension speed of 2 mm/min and a force required for dividing the layer into halves was measured. At the measurement, the powder sample was weighed so that the powder layer had a void content of 0.65–0.70. The results are shown in Table 8.

These powder fillers were used to evaluate their dispersability in the same manner as in Example 1 with the results shown in Table 8 as well.

TABLE 8

| Example No. | Filler | Average Size (microns) | Adhesion Force (g/cm²) | Number of Coagulations per cm² |
|---|---|---|---|---|
| 24 | $CaCO_3$ | 0.5 | 10.5 | 24 |
| 25 | $CaCO_3$ | 0.8 | 6.5 | 10 |
| 26 | $CaCO_3$ | 2.0 | 4.0 | 0 |
| 27 | $CaCO_3$ | 2.5 | 2.0 | 0 |
| 28 | talc | 9 | 0.5 | 0 |
| 29 | bentonite | 6 | 1.5 | 0 |
| 30 | glass beads | 15 | 4.0 | 0 |
| 31 | $Al_2O_3$ | 11 | 1.8 | 0 |

From the above results, it will be appreciated that in order to obtain molded articles of uniform quality by the direct molding, the adhesion force of the powder layer should be below 4 g/cm². Over this range, the filler coagulates and molded articles obtained are not uniform in quality.

EXAMPLES 32–35

95 vol. % of each of resins indicated in Table 9 and 5 vol. % of talc used in Example 28 were used for direct molding in the same manner as in Example 1 to evaluate the dispersability of the filler. The results are shown in Table 9 below.

TABLE 9

| Example No. | Resin | Average Size (microns) | Dispersability |
|---|---|---|---|
| 32 | polyethylene | 400 | good |
| | | 850 | good |
| | | 2000–3000 (pellets) | bad |
| 33 | ABS resin | 500 | good |

TABLE 9-continued

| Example No. | Resin | Average Size (microns) | Dispersability |
|---|---|---|---|
| | | 2000–3000 (pellets) | bad |
| 34 | polyamide | 450 | good |
| | | 2000–3000 (pellets) | bad |
| 35 | polystyrene | 500 | good |
| | | 2000–3000 (pellets) | bad |

As will be appreciated from the above results, the filler can be uniformly dispersed, when using powdery resins, irrespective of their kind.

What is claimed is:

1. In a directly moldable resin composition for composite plastics which comprises 50 to 98.5 percent by volume of a mixture of pellets of polypropylene with an average size not smaller than 2.0 mm and particles of polypropylene having an average size ranging from 30 to 40 up to 500 microns, and correspondingly from 50 to 1.5 percent by volume of at least one filler selected from the group consisting of particulate inorganic fillers having an average size ranging from 1 to 50 microns and fibrous fillers having an aspect ratio not smaller than 5, the improvement in which said at least one filler is coated with a surface active agent having a hydrophili-oleophilic balance below 13 and said surface active agent is present in an amount of 0.15 to 14.0 percent by volume of said at least one filler.

2. The directly moldable resin composition according to claim 1 wherein the resin particles are contained in an amount equal to or higher than 100 percent by volume of said at least one filler.

3. The directly moldable resin composition according to claim 1 wherein said mixture has a bulk density of from 0.34 to 0.72 g/cm$^3$.

4. In a directly moldable resin composition for composite plastics which comprises from 50 to 98.5 percent by volume of particles of polypropylene having an average size ranging from 30 to 40 up to 900 microns and a bulk density ranging from 0.34 to 0.72 and the balance of at least one filler selected from the group consisting of particulate inorganic fillers having an average particle size ranging from 1 to 50 microns and fibrous fillers having an aspect ratio not smaller than 5, the improvement in which said at least one filler is coated with a surface active agent having a hydrophilic-oleophilic balance below 13 in an amount of 0.15 to 14 percent by volume of said at least one filler.

* * * * *